United States Patent [19]

Brasier et al.

[11] Patent Number: 5,259,853
[45] Date of Patent: Nov. 9, 1993

[54] VENT GAS PROCESSING SCHEME WITH VACUUM SWING ADSORPTION

[75] Inventors: Robert S. Brasier, Mount Prospect; Steven P. Lankton, Wheeling, both of Ill.; Richard T. Maurer, Nanuet; Kirit M. Patel, Hopewell Junction, both of N.Y.

[73] Assignee: UOP, Des Plaines, Ill.

[21] Appl. No.: 988,491

[22] Filed: Dec. 10, 1992

[51] Int. Cl.⁵ .................. B01D 53/04; B01D 53/14
[52] U.S. Cl. ........................... 95/92; 95/95; 95/142
[58] Field of Search .............. 55/23, 25, 26, 48, 51, 55/58, 68, 71, 74, 75

[56] References Cited

U.S. PATENT DOCUMENTS

| | | | |
|---|---|---|---|
| 1,753,067 | 4/1930 | Ray et al. | 55/58 |
| 4,066,423 | 1/1978 | McGill et al. | 55/58 X |
| 4,104,039 | 8/1978 | Kuri et al. | 55/23 |
| 4,276,058 | 6/1981 | Dinsmore | 55/58 X |
| 4,305,734 | 12/1981 | McGill | 55/58 X |
| 4,331,456 | 5/1982 | Schwartz et al. | 55/26 |
| 4,338,101 | 7/1982 | Tuttle | 55/58 X |
| 4,343,629 | 8/1982 | Dinsmore et al. | 55/58 X |
| 4,462,811 | 7/1984 | Dinsmore et al. | 55/58 X |
| 4,670,028 | 6/1987 | Kennedy | 55/48 |
| 4,715,868 | 12/1987 | Kennedy | 55/58 X |
| 4,842,621 | 6/1989 | Robbins et al. | 55/26 |
| 4,857,084 | 8/1989 | Robbins et al. | 55/58 |
| 4,902,310 | 2/1990 | Vara et al. | 55/48 X |
| 5,057,125 | 10/1991 | Lankton et al. | 55/23 |
| 5,154,735 | 10/1992 | Dinsmore et al. | 55/26 X |

Primary Examiner—Robert Spitzer
Attorney, Agent, or Firm—Thomas K. McBride; John G. Tolomei; John G. Cutts, Jr.

[57] ABSTRACT

An integrated process for treating a vent gas stream containing halogenated organic compounds to produce a clean vent gas with vacuum swing adsorption of the halogenated organic compounds and the recycle of a gaseous stream from the halogenated organic compound recovery section. A liquid sponge oil containing halogenated organic compounds is contacted and admixed with the evacuated effluent from the adsorption zone to prevent the accumulation of normally gaseous hydrocarbonaceous compounds.

8 Claims, 1 Drawing Sheet

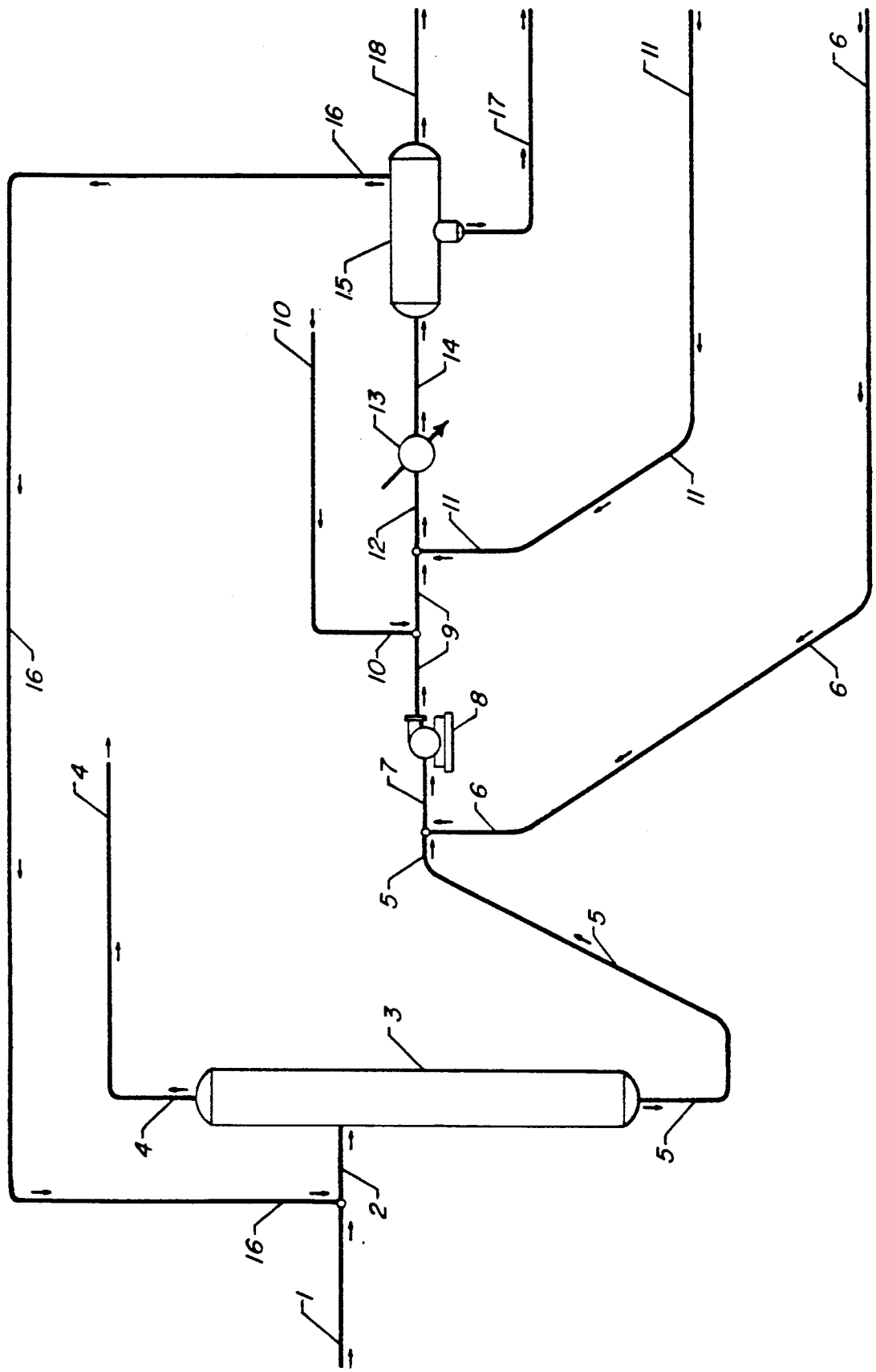

VENT GAS PROCESSING SCHEME WITH VACUUM SWING ADSORPTION

FIELD OF THE INVENTION

The field of art to which this invention pertains is the treatment of vent gas to recover contaminants and produce a clean gas which may be vented in an environmentally responsible manner. More specifically, the invention relates to an integrated process for treating a vent gas stream containing halogenated organic compounds to produce a clean vent gas with vacuum swing adsorption of the halogenated organic compounds and the recycle of a gaseous stream from the halogenated organic compound recovery section in order to avoid producing additional contaminated product streams.

BACKGROUND OF THE INVENTION

In U.S. Pat. No. 5,057,125 (Lankton et al), a process is disclosed for the removal of organic halide compounds from an effluent waste gas wherein the waste gas is sequentially compressed to separate water vapor and organic halide compounds, and to contact the resulting compressed gas having a reduced concentration of organic halide compounds with an adsorbent to produce an effluent waste gas containing essentially no detectable quantities of organic halide compounds.

In U.S. Pat. No. 4,842,621 (Robbins et al), a process is disclosed for separating a condensable gas from a non-condensable gas by switching at least three adsorber beds which preferentially adsorb the condensable gas wherein the desorption of a spent adsorber bed is conducted under a vacuum while purging the bed with a non-condensable gas and at least a portion of the gas stream recovered from the discharge of the vacuum pump is recycled to the spent adsorber bed being regenerated.

BRIEF SUMMARY OF THE INVENTION

The present invention provides a process for treating a vent gas containing halogenated organic compounds to produce a halogenated organic compound-free gas stream and a liquid stream containing the halogenated organic compounds by means of utilizing an integrated vacuum swing adsorption to recover the halogenated organic compounds and the recycle of the gaseous stream from the recovery section. A liquid sponge oil containing halogenated organic compounds is contacted and admixed with the evacuated effluent from the adsorption zone in order to ensure that there is no large buildup or accumulation in the internal recycle of normally gaseous hydrocarbonaceous compounds. The present invention enjoys the advantage of having greatly improved economics compared with other processes by means of operating the vapor-liquid separator at a temperature less than about 50° F. and utilizing a sponge oil containing halogenated organic compounds to absorb normally gaseous hydrocarbons that would build up in the recycle loop.

One embodiment of the invention may be characterized as a process for treating a vent gas stream containing halogenated organic compounds to remove and recover the halogenated organic compounds and to produce a halogenated organic compound-free gas stream which process comprises: (a) contacting the vent gas stream with an adsorbent bed in an adsorption zone at adsorption conditions to remove at least a portion of the halogenated organic compounds and to produce a halogenated organic compound-free gas stream; (b) desorbing the adsorbent bed by evacuation at subatmospheric pressure to recover at least a portion of the halogenated organic compounds adsorbed thereon; (c) introducing the resulting evacuated effluent from step (b) and a liquid sponge oil containing halogenated organic compounds into a vapor-liquid separation zone maintained at a temperature less than about 50° F.; (d) recovering a liquid stream containing halogenated organic compounds from the vapor-liquid separation zone; and (e) recovering a gaseous stream from the vapor-liquid separation zone and recycling the gaseous stream to the adsorbent bed in step (a).

Another embodiment of the invention may be characterized as a process for treating a vent gas stream containing halogenated organic compounds to remove and recover the halogenated organic compounds and to produce a halogenated organic compound-free gas stream which process comprises: (a) contacting the vent gas stream with an adsorbent bed in an adsorption zone at adsorption conditions including a pressure in the range from about 1 psig (6.9 kPa gauge) to about 1000 psig (6895 kPa gauge) and a temperature from about 40° F. (4° C.) to about 200° F. (93° C.) to remove at least a portion of the halogenated organic compounds and to produce a halogenated organic compound-free gas stream; (b) desorbing the adsorbent bed by evacuation at a pressure from about atmospheric pressure to about 50 millimeters of mercury absolute to recover at least a portion of the halogenated organic compounds adsorbed thereon; (c) introducing the resulting evacuated effluent from step (b) and a liquid sponge oil containing halogenated organic compounds, in an amount from about 1 gallon per 1000 SCF to about 500 gallons per 1000 SCF based upon the gas flow which is contacted with the liquid sponge oil, into a vapor-liquid separation zone maintained at a temperature less than about 50° F.; (d) recovering a liquid stream containing halogenated organic compounds from the vapor-liquid separation zone; and (e) recovering a gaseous stream from the vapor-liquid separation zone and recycling the gaseous stream to sorbent bed in step (a).

BRIEF DESCRIPTION OF THE DRAWING

The drawing is a simplified flow diagram of a preferred embodiment of the present invention.

DETAILED DESCRIPTION OF THE INVENTION

The present invention provides an improved process for the removal and recovery of organic halide compounds from an effluent waste gas containing organic halide compounds. A wide variety of waste gas streams are candidates for feed streams in accordance with the process of the present invention. Examples of waste gas streams which are suitable for treatment by the process of the present invention are industrial waste gas streams which contain organic halides such as vinyl chloride, chloroethane, dichloroethane, dichloroethylene, chloroform, and carbon tetrachloride, for example. Another candidate waste gas stream is produced from storage tank vent systems wherein a vent gas containing organic halide compounds is produced and must be properly treated and disposed of.

In accordance with the present invention, a feed waste gas stream containing halogenated organic compounds is and-fixed with a recycle gaseous stream which is generated in a hereinafter-described separation zone and the resulting admixture is introduced into an adsorber bed contained in an adsorption zone having an adsorbent which selectively retains halogenated organic compounds. In a preferred embodiment of the present invention, the vent gas from the adsorber bed contains less than about 5 mol ppm halogenated organic compounds and is herein referred to as "halogen-free". The resulting effluent gas from the adsorber bed is produced with essentially no detectable concentration of halogenated organic compounds. In accordance with the present invention, the adsorption zone contains at least two adsorber beds containing adsorbent and it is contemplated that while one adsorber bed is on line and removing halogenated organic compounds from the flowing gas stream, another adsorber bed is being regenerated or desorbed by evacuation at subatmospheric pressure to recover at least a portion of the halogenated organic compounds adsorbed thereon. The evacuation of a spent adsorber bed is performed by the use of a vacuum pump and additional gaseous streams may be introduced and treated in the process of the present invention by introducing them at either the suction or discharge of the vacuum pump depending upon the pressure of the gas stream to be introduced. Gaseous streams are preferably introduced at the vacuum pump if they contain a relatively low amount of non-halogenated, non-condensible gas such as nitrogen, for example, and will partially condense at the vapor-liquid separator operating conditions. The preferred gaseous streams contain relatively large amounts of halogenated organic compounds. The resulting evacuated effluent which is recovered from the adsorber bed and is discharged from the vacuum pump is preferably cooled and contacted with a liquid sponge oil containing halogenated organic compounds to absorb any normally gaseous hydrocarbons which may be present in order to prevent a subsequent buildup of these gaseous hydrocarbons within the process. The liquid sponge oil is preferably introduced in an amount from about 1 gallon per 1000 SCF to about 500 gallons per 1000 SCF, more preferably from about 10 gallons per 1000 SCF to about 100 gallons per 1000 SCF, based upon the gas flow which is contacted with the liquid sponge oil. The source of the liquid sponge oil containing halogenated organic compounds may be any convenient location and in probability will be readily available wherever a vent gas stream containing halogenated organic compounds is found. The only requirements of the liquid sponge oil are that it be a pumpable liquid and be able to absorb normally gaseous hydrocarbon compounds. The resulting admixture of the evacuated effluent and the liquid sponge oil is preferably cooled and introduced into a separation zone maintained at a temperature less than about 50° F. and more preferably less than about 40° F. The separation zone contains a vapor-liquid separator wherein a liquid stream containing halogenated organic compounds is separated and recovered. In addition, a gaseous stream is recovered from the vapor-liquid separator and is recycled to an adsorbent bed in the adsorption zone as described hereinabove. In the event that the initial vent gas contained water vapor, a liquid aqueous stream may also be recovered from the vapor-liquid separator.

The vent gas feed stream processed in the present invention is usually at or about atmospheric pressure and is preferably compressed before introduction into the adsorption zone. The pressure is selected based upon the composition of the vent gas stream containing organic halide compounds. Generally, the compression of the vent gas may be conducted in one or more stages together with any cooling desired between the compression stages.

The adsorption zone may contain any suitable adsorbent which selectively retains organic halide compounds. Depending upon the composition of the gas feed to the process of the present invention, adsorbents may be selected from the group consisting of alumina, silica, silica gel, silica-alumina, clay, crystalline aluminosilicates, activated carbon and admixture thereof. Each adsorbent may not necessarily achieve equal results in the present invention.

The adsorption zone may be operated at any suitable pressure desired. The adsorption zone may suitably be operated at conditions which include a pressure from about 1 psig (6.9 kPa gauge) to about 1000 psig (6895 kPa gauge) and a temperature from about 40° F. (4° C.) to about 200° F. (93° C.). Operating conditions of the adsorption zone are preferably selected to produce an effluent waste containing less than about 5 mol ppm halogenated organic compounds.

The adsorption zone contains two or more adsorption beds containing adsorbent which may be installed or arranged in any suitable manner. A preferred method for the installation of the adsorbent in the adsorbent beds is in a fixed bed arrangement and may be installed in either series or parallel flow. However, in order to achieve continuous operation in accordance with the present invention, at least two of the adsorbent beds must be arranged in a parallel flow arrangement. When one of the adsorbent beds becomes spent, it is taken off line and substituted by a fresh adsorbent bed. The spent adsorbent bed is then evacuated by means of a vacuum pump to desorb at least a portion of the organic halide compounds adsorbed thereon. During the regeneration of a spent adsorbent bed, the pressure is preferably maintained from about atmospheric to about 50 millimeters of mercury absolute. In accordance with the present invention, the discharge of the vacuum pump is preferably maintained at a pressure from about atmospheric to about 50 psig. It is understood that the function of the vacuum pump may be achieved in a multiplicity of steps or stages.

The flow of gas through the adsorption zone or any of the adsorber beds constituting the adsorption zone may be conducted in an upflow, downflow or radial flow manner. The temperature and pressure of the adsorption zone are preferably selected to maintain the gaseous phase and to maximize the efficiency of the adsorption zone.

DESCRIPTION OF THE DRAWING

In the drawing, the process of the present invention is illustrated by means of a simplified flow diagram in which such details as pumps, instrumentation, heat-exchange and heat-recovery circuits, compressors and similar hardware have been deleted as being non-essential to an understanding of the techniques involved. The use of such miscellaneous equipment is well within the purview of one skilled in the art.

With reference now to the drawing, a vent gas stream containing halogenated organic compounds is introduced via conduit 1, joined with a recycle stream provided via conduit 16 and the resulting admixture is introduced via conduit 2 into adsorption zone 3. A resulting vent gas stream containing essentially no halogenated hydrocarbon compounds is removed from adsorption zone 3 via conduit 4. When adsorption zone 3 becomes spent and loaded with halogenated organic compounds and hydrocarbons, adsorption zone 3 is isolated and evacuated via conduit 5 and conduit 7 by means of vacuum pump 8. In the event that there are other vent or process gas streams containing halogenated organic compounds and which are in need of treatment and disposal, such waste gas streams may be introduced via conduit 6 or conduit 10, depending upon the pressure of the waste gas stream. If the pressure of the vent gas is greater than the discharge pressure of vacuum pump 8, conduit 10 would be utilized for the introduction of the gas stream into the process. Alternatively, in the case where the vent gas stream is at a pressure lower than the discharge pressure of vacuum pump 8, the vent gas stream would be introduced via conduit 6 into the suction of vacuum pump 8. The discharge from vacuum pump 8 is carried via conduit 9 and is joined by a liquid sponge oil containing halogenated organic compounds which is introduced via conduit 11 and the resulting admixture is introduced into heat exchanger 13 via conduit 12 and is cooled. The resulting cooled stream from heat exchanger 13 is transported via conduit 14 and introduced into vapor-liquid separator 15. A gaseous stream is removed from vapor-liquid separator 15 via conduit 16 and recycled as hereinabove described. An aqueous stream is removed from vapor-liquid separator 15 via conduit 17 and recovered. A liquid stream containing halo generated organic compounds is removed from vapor-liquid separator 15 via conduit 18 and recovered.

The process of the present invention is further demonstrated by the following illustrative embodiment. Ibis illustrative embodiment is, however, not presented to unduly limit the process of this invention, but to further illustrate the advantages of the hereinabove described embodiments. The following data were not obtained by the actual performance of the present invention, but are considered prospective and reasonably illustrative of the expected performance of the invention.

ILLUSTRATIVE EMBODIMENT

A vent gas having the characteristics presented in Table 1 is introduced as one feedstock at atmospheric pressure and at a rate of 100 mass units per hour to the suction of a blower. The vent gas is compressed and cooled to a pressure of 5 psig and a temperature of 100° F. The resulting compressed and cooled vent gas is then introduced into an adsorber bed containing activated carbon. In addition, a gaseous recycle stream in an amount of 44 mass units per hour containing 27 weight percent nitrogen, 42 weight percent normally gaseous hydrocarbons and 31 weight percent halogenated hydrocarbons is also introduced into the adsorber bed containing activated carbon. The resulting effluent from the adsorber bed is in an amount of 87 mass units per hour and contains essentially pure nitrogen.

TABLE 1

| Component | VENT GAS ANALYSIS | |
|---|---|---|
| | Volume Percent | Weight Percent |
| Nitrogen | 93.7 | 84.8 |
| Normally Gaseous Hydrocarbons | 0.7 | 0.8 |
| Halogenated Organic Compounds | 5.3 | 14.2 |

TABLE 1-continued

| Component | VENT GAS ANALYSIS | |
|---|---|---|
| | Volume Percent | Weight Percent |
| Water Vapor | 0.3 | 0.2 |

An off-line, spent adsorber bed is evacuated to a pressure of about 100 mm Hg by means of a vacuum pump to produce a stream in an amount of 58 mass units per hour containing 0.5 weight percent water, 34 weight percent normally lo gaseous hydrocarbon and 49 weight percent halogenated hydrocarbon, with the balance nitrogen, and having a temperature of about 150° F. Ibis resulting discharge effluent from the vacuum pump is admixed with a liquid sponge oil in an amount of 142 mass units per hour containing 87 weight percent halogenated organic compounds and the resulting admixture is cooled to a temperature of about 39° F. Another vent gas stream, referred to as a process vent, having the characteristics presented in Table 2 is introduced as a second feedstock into the discharge line of the vacuum pump at a rate of 112 mass units per hour. The resulting cooled admixture is introduced into a vapor-liquid separator to produce a gaseous stream in an amount of 44 mass units per hour containing 27 weight percent nitrogen, 31 weight percent halogenated hydrocarbons and 42 weight percent normally gaseous hydrocarbons and 0.3 weight percent water. The vapor-liquid separator also produces an aqueous stream in an amount of 5 mass units per hour and a halogenated organic compound containing stream in an amount of 262 mass units per hour and containing 91.5 weight percent halogenated organic compound.

TABLE 2

| Component | PROCESS VENT GAS |
|---|---|
| | Weight Percent |
| Nitrogen | 2.2 |
| Normally Gaseous Hydrocarbons | 6.8 |
| Halogenated Organic Compounds | 90.7 |
| Water Vapor | 0.3 |

Under appropriate operating conditions, the same or similar to those described hereinabove, one may obtain essentially complete removal of halogenated lo organic compounds from a vent gas thereby preventing the release of polluting compounds into the atmosphere.

The foregoing description, drawing and illustrative embodiment clearly illustrate the advantages encompassed by the process of the present invention and the benefits to be afforded with the use thereof.

What is claimed:

1. A process for treating a vent gas stream containing halogenated organic compounds to remove and recover said halogenated organic compounds and to produce a halogenated organic compound-free gas stream which process comprises:
    (a) contacting said vent gas stream with an adsorbent bed in an adsorption zone at adsorption conditions to remove at least a portion of said halogenated organic compounds and to produce a halogenated organic compound-free gas stream;
    (b) desorbing said adsorbent bed by evacuation at subatmospheric pressure to recover at least a portion of said halogenated organic compounds adsorbed thereon;
    (c) introducing the resulting evacuated effluent from step (b) and a liquid sponge oil containing halogenated organic compounds into a vapor-liquid separation zone maintained at a temperature less than about 50° F.;

(d) recovering a liquid stream containing halogenated organic compounds from said vapor-liquid separation zone; and (e) recovering a gaseous stream from said vapor-liquid separation zone and recycling said gaseous stream to said adsorbent bed in step (a).

2. The process of claim 1 wherein at least one additional gas stream containing halogenated organic compounds is introduced into said vapor-liquid separation zone.

3. The process of claim 1 wherein said vent gas stream comprises nitrogen, normally gaseous hydrocarbon compounds and halogenated organic compounds.

4. The process of claim 1 wherein said adsorption zone is operated at conditions which include a pressure in the range from about 1 psig (6.9 kPa gauge) to about 1000 psig (6895 kPa gauge) and a temperature from about 40° F. (4° C.) to about 200° F. (93° C.).

5. The process of claim 1 wherein said adsorption zone contains an adsorbent selected from the group consisting of alumina, silica, silica gel, silica-alumina, clay, crystalline aluminosilicates, activated carbon and admixtures thereof.

6. The process of claim 1 wherein said desorbing in step (b) is conducted at a pressure in the range from about atmospheric to about 50 millimeters of mercury absolute.

7. The process of claim 1 wherein said liquid sponge oil is introduced in an amount from about 1 gallon per 1000 SCF to about 500 gallons per 1000 SCF based upon the gas flow which is contacted with said liquid sponge oil.

8. A process for treating a vent gas stream containing halogenated organic compounds to remove and recover said halogenated organic compounds and to produce a halogenated organic compound-free gas stream which process comprises:

(a) contacting said vent gas stream with an adsorbent bed in an adsorption zone at adsorption conditions including a pressure in the range from about 1 psig (6.9 kPa gauge) to about 1000 psig (6895 kPa gauge) and a temperature from about 40° F. (4° C.) to about 200° F. (93° C.) to remove at least a portion of said halogenated organic compounds and to produce a halogenated organic compound-free gas stream;

(b) desorbing said adsorbent bed by evacuation at a pressure from about atmospheric pressure to about 50 millimeters of mercury absolute to recover at least a portion of said halogenated organic compounds adsorbed thereon;

(c) introducing the resulting evacuated effluent from step (b) and a liquid sponge oil containing halogenated organic compounds, in an amount from about 1 gallon per 1000 SCF to about 500 gallons per 1000 SCF based upon the gas flow which is contacted with said liquid sponge oil, into a vapor-liquid separation zone maintained at a temperature less than about 50° F.;

(d) recovering a liquid stream containing halogenated organic compounds from said vapor-liquid separation zone; and (e) recovering a gaseous stream from said vapor-liquid separation zone and recycling said gaseous stream to said adsorbent bed in step (a).

* * * * *